April 12, 1949. H. D. MORGAN 2,466,727
DENTURE
Filed Oct. 8, 1943
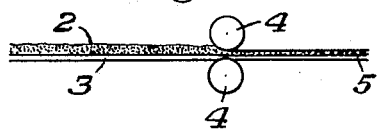
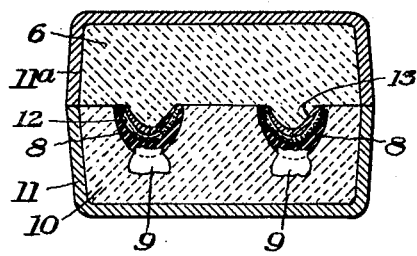
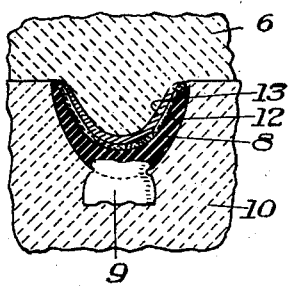
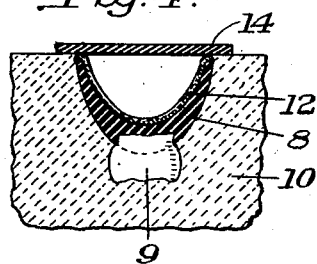
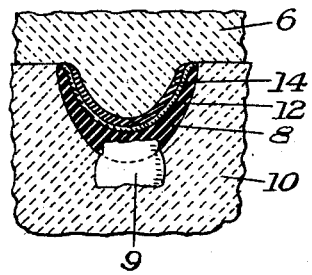
INVENTOR
Hugh D. Morgan
By Christy, Parmelee and Strickland
his attorneys Patented Apr. 12, 1949

2,466,727

UNITED STATES PATENT OFFICE 2,466,727

DENTURE

Hugh D. Morgan, Youngstown, Ohio

Application October 8, 1943, Serial No. 505,462

2 Claims. (Cl. 32—2)

This invention pertains to an improvement in artificial dentures and a method of making the same, and the present application is a continuation-in-part of my abandoned application Serial No. 424,356, filed December 24, 1941 for Dentures and the manufacture thereof.

In my prior Patent No. 2,036,715, dated April 7, 1936, there is disclosed an artificial denture and a method of making the same according to which the gum-engaging recess of the dental plate is lined with a thermoplastic material which is slightly resilient at body temperatures but which at a temperature slightly above body temperature softens and can be molded and shaped. The lining material disclosed in said patent comprises a mixture of latex and balata. It is of a tough and non-porous resilient nature not affected by the fluids of the mouth. These dentures in use have proved highly satisfactory but it has proven difficult to secure the thermoplastic lining to the dental plate with uniform good results. In many instances the lining may be secured to the dental plate in a highly satisfactory manner, but in other cases there will be poor adhesion. The fact that uniformly satisfactory adhesion can not be secured between the lining and the denture itself has impeded the general acceptance of the denture by the profession and by dental supply houses. Dental supply houses must exercise special care that the product which they distribute can be used under all conditions with uniformly good results.

In my copending application above referred to, I have disclosed a method of securing adhesion between the thermoplastic lining material and the denture which embodies the method of dissolving balata and acrylic resin in a common solvent, forming a film from this solution and using it as a bonding medium between the denture and the liner. While this proved quite satisfactory under carefully controlled conditions, it did not prove itself to be a technique which could be relied upon to give widely uniform results, and the present invention constitutes an improvement through which highly satisfactory results have so far in all cases been obtained.

As pointed out in my copending application, an adhesive medium containing balata is satisfactory for use with the thermoplastic lining material because the balata in the bonding medium will be compatible with the balata in the thermoplastic liner and form a good bond. Acrylic resin is a satisfactory bonding medium for adhesion to the plate of the denture because many dental plates are formed of acrylic resin and therefore the acrylic resin in the bonding medium will combine with that in the denture. Even where the denture is a vulcanite denture the acrylic resin forms a good bond because it will adhere to vulcanite. However, where the acrylic resin is diffused through the balata, as is the case where the balata and the resin are dissolved in a common medium, much of the acrylic resin is in contact with the thermoplastic liner and much of the balata is in contact with the dental plate, and the bond is not as satisfactory as preliminary experiments indicated. This technique had a further disadvantage because of the difficulty of securing complete evaporation of the solvent.

In carrying out the present invention, acrylic resin molding powder or compound is sprinkled generously over a thin sheet of balata so as to completely cover one surface of the balata. This sheet is then milled between rolls to form a film, one surface of which is substantially completely covered with acrylic resin and the other of which is completely balata. In the forming of the denture the composite film so produced is sandwiched between the material constituting the plate of the denture and the thermoplastic lining, and the parts assembled in this relation are heated. In the assembly the balata side of the composite film is next to the thermoplastic lining of balata and latex, and acrylic resin is toward the material constituting the plate of the denture. In the subsequent heating under pressure the acrylic film carried on the bonding sheet will fuse to the denture material, and the balata portion of the film will fuse to the thermoplastic liner, and the balata and acrylic resin will unite with each other. This forms a uniform continuous bond between the dental and the thermoplastic liner.

The technique may be varied according to whether the denture is a vulcanite denture or is an acrylic denture and it will also vary according to whether the invention is being applied to a new denture for the first time being constructed or whether it is being used for the refitting of an existing denture. In the setting up of a new denture formed from acrylic resin, a model is made of the patient's gums in the usual way. This model is then covered with a heavy layer of metal foil, as described in my Reissue Patent No. 18,311, dated December 29, 1931.

The denture is then built up on this metal foil. The teeth are arranged in the acrylic resin plate-forming compound. The metal plate is removed and a sheet of bonding material, prepared as above described, after being softened by solvent for the resin is spread over the denture. The metal plate is then reapplied to the model and is used to squeeze out excess bonding material. The denture with the remaining bond, all in the flask under pressure at about 150° to 160° F. is then heated for about two hours. After this, the flask is opened, the lining material is heated to the softening point, spread over the surface of the denture which now carries the bond, and the assembly, in the flask, is again heated to 150° to 160° F. for about half an hour.

The denture is then complete, except for trimming away excess thermoplastic liner and cleaning up the denture. When finished, it is warmed to about 120° F., inserted in the patient's mouth, and the liner takes the impression of the parts of the mouth which it contacts. Upon being cooled to body temperature, the liner takes a permanent set, and the denture can be used. This procedure is more simple than any previously developed and results in a considerable saving of time, especially when the denture and bond are molded and "cured" in a single operation. The purpose of using the heavy foil plate is to assure that the mold-engaging recess of the dental plate will be sufficiently oversize to accommodate the lining of thermoplastic material.

In the making of vulcanite dentures the procedure is varied slightly in that the rubber must be vulcanized before the bonding sheet and the thermoplastic material are applied. In the refitting of existing dentures the gum-engaging surface is cut away through the use of suitable burring tools so as to make the recess oversize, after which the bonding material and thermoplastic liner are secured in place.

The nature of my invention may be more fully understood by reference to the accompanying drawings, in which:

Figure 1 is a schematic view illustrating the milling of the acrylic resin into the surface of the balata film to form the bonding sheet;

Figure 2 is a cross section through the flask assembly showing the manner of applying the bonding sheet under pressure;

Figure 3 is an enlarged fragmentary view of a portion of Figure 2;

Figure 4 is a similar fragmentary view after the flask has been opened, showing the sheet of thermoplastic lining material in position to be applied;

Figure 5 is a view similar to Figure 3 showing the lining material being applied under pressure; and Figure 6 is a perspective view showing a portion of the completed denture.

Referring first to Figure 1 of the drawings, the bonding sheet is prepared by sprinkling granulated or powdered acrylic molding powder 2 onto one surface only of a thin sheet of balata 3 and the sheet is then milled between rolls 4 until the resulting sheet 5 has the molding powder thoroughly milled into it. In its finished form, there is about 60% resin and 40% balata. This sheet material may be prepared by dental supply houses long in advance of the time when it is needed.

When making the denture, the dentist makes an impression, as usual, and from this he prepares a positive model having a ridge corresponding to the patient's gum. Over this ridge is worked heavy foil to form a spacer as described in my said reissue patent. The denture is prepared over this foil base. Assuming that the denture is being made of acrylic resin, the teeth are set up in the molding compound and the assembly is invested in one part of a flask. This is shown in Figures 2 and 3 in which the base material or resin is designated 8 and the teeth are marked 9, the surrounding body of plaster being 10 and the flask is 11.

At this stage the dentist is ready to use the bonding sheet. He immerses it, resin side down, in a solvent for acrylic resin until the resin coating softens. Then he lays the sheet over the gum-engaging surface of the denture. This layer of prepared balata and resin is designated 12 Figures 2 and 3. A complementary part 6 is prepared in the upper part 11a of the flask, and it with the metal foil spacer 13 is clamped down onto the lower part of the flask. Some of the bonding film will be squeezed out, and this excess is cleaned away. Then the flask 11—11a is clamped shut and the whole assembly heated for about two hours at between about 150° F. and 160° F. In this heating, the body 8 of the resin is "cured" and the resin in the bonding sheet is integrally united with it.

Following this, the flask is opened. A sheet of rubberous lining material 14, preferably comprised of balata and latex, and described in my Patent No. 2,036,715, is heated to its softening point, around 130° and laid over the denture, as shown in Figure 4, after which it is worked with the fingers over the gum-engaging surface of the denture. When it has been smoothly spread, the top of the flask with its mold is again applied, this time without the foil spacer and the parts are pressed together as shown in Figure 5. Excess lining material is squeezed out, cleaned away and the flask then clamped shut and heated for about half an hour at around 150° F. to 160° F. In this step of the process, the liner 14 bonds to the balata surface previously deposited on the denture from the bonding sheet, becoming integral therewith.

Upon opening the flask, the denture is removed and the liner is firmly united to the denture. This liner, as explained in my said Patent No. 2,036,715, is thermoplastic, softening slightly above body temperature. After cleaning the denture, it is heated to between about 120° and 130° F. and then inserted in the patient's mouth. The patient applies masticating pressure, and the liner is thus given its final impression and fitted in situ.

If the denture is of vulcanite instead of acrylic resin, the procedure is about the same except that the vulcanite must be cured at a higher temperature, and hence it is vulcanized, after which the bonding film is applied and heated in the flask to apply it to the denture, after which the liner is applied.

In lining old dentures, the gum-engaging surface is cut away to make room for the liner, after which the bonding sheet and then the liner are applied successively, as with a new vulcanite denture.

My invention provides not only an improved bonding technique and film, but it is important that the bonding film is applied to the denture and thereafter to the liner under heat and pressure, thus assuring a secure bond. The acrylic side of the bonding film firmly attaches, as hereinbefore stated, to the denture while the balata in the film attaches to and becomes a part of the liner.

While I have illustrated and described my invention specifically, it will be understood that various changes and modifications may be made within the contemplation of my invention.

I claim:

1. A denture comprising a rigid plate element of a plastic composition having a gum-engaging surface, a thermoplastic lining of a rubber-like compound over the gum-engaging surface of the denture and moldable upon heating to the contour of the mouth of the user, and a bonding medium for holding the lining on the rigid plate element while enabling the thermoplastic lining to be molded, comprising a separate film introduced between the lining and the plate element, the surface of the film next to the lining being substantially entirely balata and the surface of the film adjacent the plate element being covered with acrylic resin, the acrylic resin of said film being bonded inseparably to the denture and the balata surface of the film being inseparably bonded to the liner.

2. A denture comprising a rigid plate element formed of acrylic resin, the plate element having a gum-engaging surface, a thermoplastic lining over the gum-engaging surface composed of a mixture of latex and balata, said lining being thermoplastic and moldable upon heating to a temperature which will not burn the mouth of the user, whereby the lining may be molded in the mouth of the user to the contour of his gums, and a bonding medium for holding the said moldable lining on the rigid acrylic resin plate comprising a separate film introduced between the lining and the plate, the surface of said film next to the lining being substantially entirely balata, and being inseparably bonded to the lining, the surface of the film adjacent the plate element being covered with acrylic resin, said resin being inseparably bonded into the resin of the original plate element.

HUGH D. MORGAN.

REFERENCES CITED

The following references are of record in the file of this patent:

UNITED STATES PATENTS

| Number | Name | Date |
| --- | --- | --- |
| 1,900,663 | Plauson | Mar. 7, 1933 |
| 2,036,678 | Elake | Apr. 7, 1936 |
| 2,036,715 | Morgan | Apr. 7, 1936 |
| 2,078,881 | Munzinger | Apr. 27, 1937 |
| 2,145,412 | Winkelmann | Jan. 31, 1939 |
| 2,163,243 | Kenney | June 20, 1939 |
| 2,171,389 | Ten Cate | Aug. 29, 1939 |
| 2,286,966 | Johnson | June 16, 1942 |
| 2,326,927 | Conrad | Aug. 17, 1943 |